March 26, 1963 TETSUO OGAWA ET AL Re. 25,359

PROCESS FOR RESOLUTION OF RACEMIC GLUTAMIC ACID AND SALTS THEREOF

Original Filed Jan. 20, 1958

TETSUO OGAWA
TAKEKAZU AKASHI
INVENTORS

BY Arnold Scherson
ATTORNEY.

United States Patent Office

Re. 25,359
Reissued Mar. 26, 1963

25,359

PROCESS FOR RESOLUTION OF RACEMIC GLUTAMIC ACID AND SALTS THEREOF

Tetsuo Ogawa, Tokyo, and Takekazu Akashi, Kawasaki-shi, Kanagawa-ken, Japan, assignors to Ajinomoto Co., Inc., Tokyo, Japan, a corporation of Japan Original No. 2,940,998, dated June 14, 1960, Ser. No. 710,015, Jan. 20, 1958. Application for reissue June 11, 1962, Ser. No. 203,687
Claims priority, application Japan Oct. 15, 1953
15 Claims. (Cl. 260—534)

Figure 1:
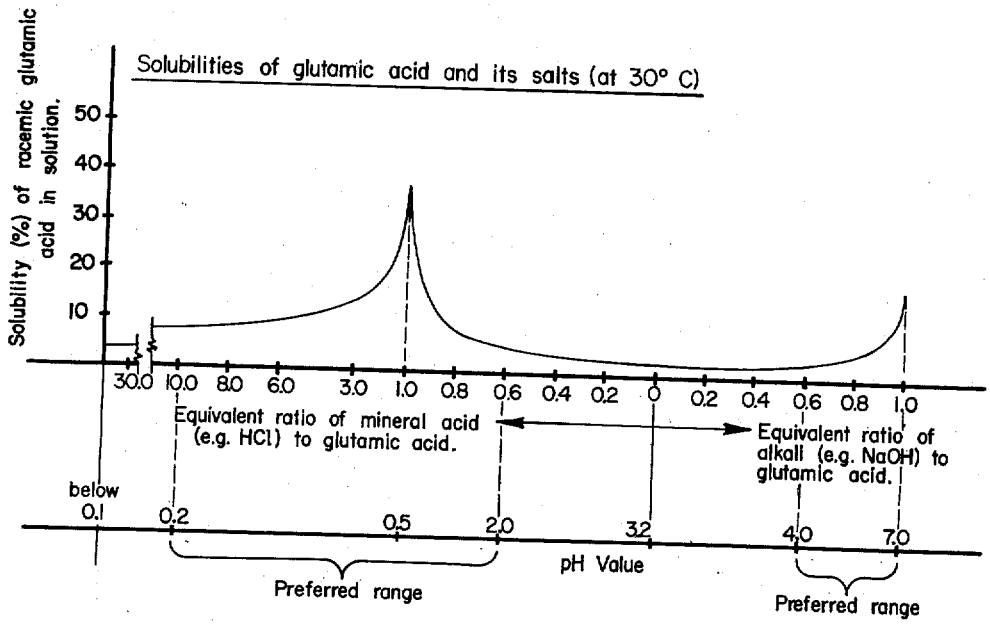

Matter enclosed in heavy brackets [ ] appears in the original patent but forms no part of this reissue specification; matter printed in italics indicates the additions made by reissue.

This invention relates generally to processes for the resolution of racemic glutamic acid and salts thereof, in order to obtain the optical isomers of the racemic compounds, and this application is a continuation-in-part of our prior application Serial No. 462,366, filed October 14, 1954, and now abandoned.

L-glutamic acid is a well known seasoning material used in cooking and the like. Since chemical processes for the synthesis of glutamic acid result in the formation of its racemic modification, namely DL-glutamic acid, cheap and simple methods for resolution of DL-glutamic acid are especially important in this field. Although it has been proposed to [produced] *produce* L-glutamic acid by resolution of DL-glutamic acid through the use of chemical and biochemical reagents, these procedures have a number of disadvantages for industrial purposes, in that they require the use of rather expensive reagents and usually involve many tedious and troublesome operations. It has been also proposed to resolve DL-glutamic acid by physiochemical or mechanical methods, but such methods also have many disadvantages, such as, poor reproducibility of the same result and low efficiency of resolution.

Accordingly, it is an object of the invention to provide a commercially practical process for resolving racemic glutamic acid and salts thereof, in order to obtain the highest possible yield of the desired optical isomers during the shortest possible operating period.

In accordance with an aspect of the present invention, racemic glutamic acid, that is, DL-glutamic acid, is resolved into its optical isomers by seeding an aqueous supersaturated solution of the racemic glutamic acid with crystals of one of the isomers thereof to cause the corresponding isomer in the supersaturated solution to crystallize out of the solution. It has been found that the efficient resolution of racemic glutamic acid into its optical isomers L-glutamic acid and D-glutamic acid requires that the rate of crystallization of the optically active glutamic acid or salts thereof be maintained under a predetermined maximum, and that the crop, or total amount of the optically active isomer crystallized during each stage of the process must also be held below a predetermined maximum value based upon the total quantity of racemic glutamic acid or salts thereof contained in the solution which is to be resolved.

Accordingly, it is another object of the invention to determine those maximum limits of the rate of crystallization and of the total crystallization which must be maintained in a commercially acceptable process.

Another object of this invention is to facilitate supersaturation of solutions of racemic glutamic acid intended for resolution into its optical isomers by utilizing racemic glutamic acid monohydrate and a bottom solid or solid phase in the solution at a temperature higher than the transition point between the monohydrate and anhydrate form, so that the monohydrate causes supersaturation of the solution, and thereby facilitates and simplifies the resolution of racemic glutamic acid.

Another object of this invention is to provide processes for the resolution of racemic glutamic acid and salts thereof applicable over a relatively wide range wherein conglomerate type racemic salts of glutamic acid and double-salt type racemic glutamic acids are included, but complex-salt type racemic glutamate is excluded.

A further object of the invention is to provide a reliable semi-continuous process for resolving racemic glutamic acid, racemic salts of glutamic acid, such as, racemic glutamic acid hydrochloride, or racemic monoammonium glutamate.

The above, and other objects, features and advantages of the invention, will be apparent in the following detailed description and in the illustrative examples thereof.

Figure 2:
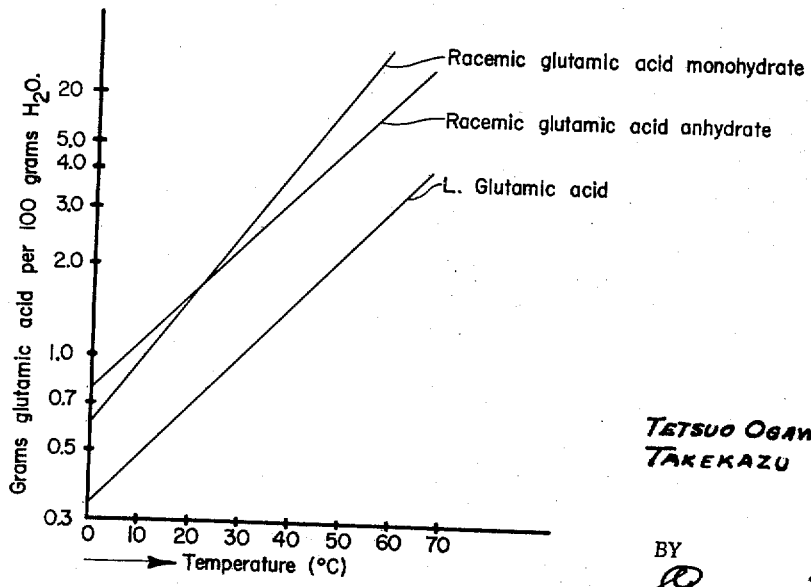

In the accompanying drawing:

FIG. 1 is a graph showing the solubilities of glutamic acid and its salts at 30° C. for various degrees of acidity and alkalinity; and FIG. 2 is a graph showing the solubility of racemic glutamic acid, racemic glutamic acid monohydrate and L-glutamic acid at various temperatures.

In accordance with the present invention, whereby racemic glutamic acid is resolved into its optical isomers by seeding an aqueous supersaturated solution of the racemic glutamic acid with crystals of one of the isomers to cause the corresponding isomer in the supersaturated solution to crystallize out, it has been found that the rate of crystallization should be controlled to less than 7.5% per hour of the total quantity of racemic glutamic acid in the solution and that the total crystallization should be limited to not more than an amount corresponding to 25% of the total quantity of glutamic acid in the solution.

The above maximum rate of crystallization of optically active glutamic acid or its salts is applicable to each of the hereinafter mentioned methods of effecting supersaturation, such as, by the monohydrate as a bottom solid, or by cooling, evaporation or partial neutralization. Which of these methods of supersaturating the solution is adopted depends upon the kinds of racemic glutamic acid or its salts contained in the raw material to be treated, their concentration, their phase (solid or liquid), temperature and the like.

The rate of crystallization of optically active glutamic acid and glutamates is dependent upon the rate of cooling, rate of partial neutralization or rate of concentration (evaporation), where such means are employed for effecting supersaturation, or upon the maintained temperature of the solution supersaturated by a bottom solid of the monohydrate. The rate of crystallization increases as the rate of cooling, rate of partial neutralization or rate of evaporation is gradually increased until the rate of crystallization reaches 7.5% per hour. But, after the rate of crystallization reaches 7.5% per hour, further increases in the rate of cooling, partial neutralization or evaporation do not further increase the rate of crystallization, but, on the contrary, serve to decrease the latter.

Similarly, it has been found that the maximum amount of crystallization of optically active glutamic acid and glutamates resolved in each stage corresponds to about 25% of the total racemic glutamic acid or glutamates in the solution. Above that limit, even if further resolution is attempted by means of further cooling, partial neutralization or evaporation, the crystallization of optically active glutamic acid and glutamates is diminished, while the crystallization of racemic glutamic acid and glutamates is remarkably increased.

Approaching the above maximum quantity of crystallization too closely is not always safe without extremely careful attention and controlling the total crystallization to no more than about 20% is preferable. Similarly, approaching of the rate of crystallization too closely to the limit 7.5% per hour of the total quantity of racemic glutamic acid in the solution is not always safe in the absence of careful supervision and controlling the rate of crystallization between 3–6% per hour is preferable.

The processes in accordance with this invention may be operated at temperatures in the ranges shown in the following table:

| Means for Supersaturating | $rG^{H}$ | $rG^{HCl}$ | $rG^{NH_4}$ |
|---|---|---|---|
| Cooling | 20–80° C. (opt. 30–60° C.). | 20–80° C. (opt. 30–60° C.). | 20–60° C. (opt. 30–60° C.). |
| Evaporation, Part. neutr. | 20–60° C. (opt. 20–30° C.). | 20–60° C. (opt. 20–30° C.). | 20–60° C. (opt. 30–40° C.). |
| Monohydrate | 22°±2° C.–50° C. (opt. 25–40° C.). | | |

In general cooling is a convenient means of effecting supersaturation, while partial neutralization is effective in cases where the concentration of racemic glutamic acid in the solution is comparatively high, and evaporation may be adopted in cases where the concentration is comparatively low. On the other hand, the use of racemic glutamic acid monohydrate as a bottom solid has the advantage of automatically maintaining the supersaturated condition of the solution as the seeded isomer crystallizes out.

Further, it has been found that D-glutamic acid and L-glutamic acid form, in the neutral range, complex-salt type racemic compounds (monoalkali glutamates), which have the strongest association or linkage between the two isomers, but that the association is weakened gradually in proportion to the added quantities of mineral acids or alkalies. Thus, a double-salt type racemic compound is formed in the range of free glutamic acid, while conglomerates of both isomers are formed either in the range of mineral acid salts thereof or in the range of dialkali-salts thereof and even in the ranges containing additional quantities of mineral acids or alkalies.

It has been further found that a solid capable of existing at the bottom in a solution of glutamic acid, water and either mineral acid or alkali is racemic glutamic acid in the state of a double-salt type which forms two kinds of crystals, one of them existing as the anhydrate at temperatures higher than 22° C.±2° C., the transition point, while the other exists as the monohydrate at temperatures lower than said transition point of 22° C.±2° C.

The temperature coefficient of solubility of the monohydrate is remarkably higher than the corresponding coefficient of optically active glutamic acids, while the temperature coefficient of solubility of the anhydrate is slightly smaller than said coefficients of optically active glutamic acids, as illustrated in FIG. 2. In other words, the heat of solution of the monohydrate is considerably higher than those of optically active glutamic acids, while that of the anhydrate is slightly lower than those of optically active glutamic acids. Resolution processes according to this invention may utilize either the alkaline or acidic range of solutions of heterogeneous univariant equilibrium systems consisting of three components which are racemic glutamic acid, water and mineral acid or alkali, and containing the monohydrate of racemic glutamic acid as bottom solid in the solution.

If a saturated solution of the above mentioned heterogeneous univariant equilibrium system consisting of the three components and containing monohydrate of racemic glutamic acid as the bottom solid therein in either the acidic or the alkaline range is inoculated with fine seed crystals of one of the two isomers of optically active glutamic acid at a temperature higher than 22° C.±2° C., the same isomer as the seed crystals gradually crystallizes out from the solution, leaving the antipode in the solution saturated with racemic glutamic acid. At such time, the solid monohydrate cannot remain as such and gradually dissolves into the solution as the isomer crystallizes out. In other words, the supersaturated state, that is, equilibrium between racemic glutamic acid monohydrate as the solid in the solution and racemic glutamic acid as one of the solutes is broken by crystallization of the isomer and dissolution of the monohydrate into the solution occurs at the same time. Thus, crystallizing out of one of the optical isomers and dissolving in of the monohydrate of racemic glutamic acid occur simultaneously and continuously so that the supersaturation of the solution with racemic glutamic acid is maintained and the resolution is carried out continuously.

It is important that the monohydrate, which is stable only at a temperature lower than 22° C.±2° C., be used as the solid phase in the solution at a temperature higher than 22° C.±2° C., that is, in the region where the anhydrate crystallizes out. In consequence of this, the solution becomes supersaturated with regard to the anhydrate, thereby giving rise to an enormous potential for crystallization of optically active glutamic acid, and moreover the presence of the monohydrate crystals makes the supersaturation regarding the anhydrate remarkably stable.

However, if the operation is carried out at too high a temperature in an attempt to further increase the degree of supersaturation due to the monohydrate bottom solid, crystallization of the anhydrate is apt to occur and this obstructs the resolution of racemic glutamic acid.

The most preferable range of temperatures for the process of resolution employing the monohydrate as a bottom solid has been found to be approximately between 25° C. and 40° C., between which temperatures an adequate degree of supersaturation due to the monohydrate as the bottom solid may be maintained, while the tendency towards crystallization of the anhydrate is comparatively low. More specifically, the above process for resolution of racemic glutamic acid may be carried out as follows:

A supersaturated solution containing racemic glutamic acid, water and mineral acid or alkali, as the solutes and the solvent, and racemic glutamic acid monohydrate as the bottom solid in said solution is first prepared. The supersaturated solution is then inoculated with one of the two isomers of racemic glutamic acid, and the inoculated solution is vigorously stirred while being maintained at a temperature higher than approximately 22° C. and lower than approximately 50° C. The developed crystals of the same isomer as that with which the solution was inoculated are collected, for example, by filtration. Racemic glutamic acid monohydrate is added to the remaining clear mother liquor to restore the supply of bottom solid. The solution is then inoculated with the antipode of the previously obtained optically active glutamic acid. Following vigorous agitation of the solution, and maintenance of the temperature, within the above limits, the developed crystals of the same isomer as those employed for the second inoculation are collected. Cyclical repetition of the above steps may be applied to the clear mother liquor in a semicontinuous fashion.

The principle of the above described procedure may be applied to the resolution of racemic glutamic acid in a process wherein the supersaturated state of the solution is obtained by means of evaporation, cooling or partial neutralization or the like rather than by the use of the monohydrate as a bottom solid.

As previously mentioned, it has been found that D- and L-glutamic acids form, in neutral range, complex-salt type racemic compounds (monoalkali glutamates), which have the strongest association between the two isomers, but that the association becomes weaker gradually in proportion to the added quantities of mineral acids for example, hydrochloric acid or sulfuric acid, or alkalies, for example, sodium hydroxide or potassium hydroxide, with a double-salt type racemic compound being formed in the range of free glutamic acid while conglomerates of both isomers are formed either in the range of mineral acid salts thereof or in the range of dialkali salts thereof. Racemic glutamic acid in the range of the double salt type compound has been found to be also capable of being resolved by supersaturating the heterogeneous univariant equilibrium system consisting of racemic glutamic acid, water and mineral acid or alkali, inoculating or seeding said solution with one of the isomers of the racemic acid, stirring said solution, maintaining the supersaturated solution by means of concentration, cooling or partial neutralization rather than by the previously described monohydrate as the bottom solid, collecting the developed crystals of seeded isomer, supplementing the supply of racemic glutamic acid, supersaturating the solution, inoculating it with the antipode of the first seeded isomer, stirring the solution, maintaining the supersaturated state of the solution, collecting the developed crystals of the antipode and repeating the steps in succession. The preferable temperature for the process ranges from approximately 20° C., that is, room temperature, to about 80° C.

Racemic glutamic acid hydrochloride is also capable of being resolved in a way similar to that described above, except that racemic glutamic acid hydrochloride is used instead of free racemic glutamic acid in preparing the supersaturated solution and supplementing the racemic compound. The preferable temperature for the process of resolving racemic glutamic acid hydrochloride also ranges from room temperature to about 80° C.

Application of a similar process to racemic dialkali glutamates gives extremely fine crystals of optically active glutamate in an extraordinarily viscous solution and is therefore unfavorable for industrial purposes.

It has also been found that racemic monoammonium glutamate can be resolved in a similar way, except that racemic monoammonium glutamate is used in lieu of free glutamic acid or its hydrochloride in preparing the supersaturated solution and in supplementing the racemic compound. The preferable temperature for this process ranges from room temperature to about 60° C. However, the resolution process embodying this invention is not applicable to racemic monoalkali glutamates which are complex-salt type compounds.

In connection with the mineral acids or alkalies included in the solutions formed initially in the above described methods, the solubilities of racemic glutamic acid change remarkably in proportion to the quantities of such mineral acids or alkalies.

Racemic glutamic acid is only slightly soluble in water, but the solubility increases remarkably by the addition of quantities of mineral acids or alkalies which are over 60% of the amounts of mineral acids or alkalies theoretically necessary to neutralize an equivalent of glutamic acid, and reaches maximum when neutralization is accomplished. But the solubility of glutamic acid is again reduced to a very low value by the addition of quantities of mineral acids which are over twelve times as much as the amount of mineral acid theoretically necessary to neutralize an equivalent of glutamic acid.

In accordance with this invention, best resolution results are generally obtained with solutions having high concentrations of glutamic acid or its salts. Consequently, in order to obtain good results, it has been found that the amount of mineral acids in the solution should be at least between 0.6 and 10, and preferably between 0.8 and 5.0, equivalents per mole of DL-glutamic acid in the solution, while, in the case of solutions containing alkalies, the latter should be present in amounts at least between 0.6 and 1.0, and preferably between 0.8 and 1.0, equivalents per mole of DL-glutamic acid.

As shown in FIG. 1, the above relative amounts of mineral acids and alkalies correspond to ranges of pH values between approximately 0.2 and 2.0 and between approximately 4.0 and 7.0, respectively.

In general, the stability of a supersaturated solution of either racemic glutamic acid, that is, DL-glutamic acid, or its salts decreases as the temperature is elevated. In other words, the tendency towards crystallization of either racemic glutamic acid or racemic salts thereof from a supersaturated solution thereof increases with elevation of temperature. Therefore, the solution employed in the resolving process should be maintained at a temperature lower than the upper limits specified in each case described above.

Development or growth of the optically active glutamic acid or salts thereof is remarkably accelerated by turbulence of the supersaturated solution caused by agitating, stirring, mixing or the like. Thus, producing turbulence is one of the important conditions necessary in carrying out the process for resolution according to this invention.

EXAMPLE 1

(A) A 10% HCl aqueous solution was saturated with racemic glutamic acid anhydrate (total nitrogen 9.53%; $(\alpha)_D=\pm 0.00°$) at 30° C. and filtered. To 150 g. of the filtrate (total glutamic acid 29.2%; HCl 7.12%; pH 0.84) were added 7.85 g. of racemic glutamic acid monohydrate (total nitrogen 8.49%; $(\alpha)_D=\pm 0.00°$), containing 7.0 g. of anhydrous glutamic acid, as a solid phase (bottom solid), and 3.5 g. of pure L-glutamic acid (total nitrogen 9.53%, $(\alpha)_D=+31.6°$) as crystal seeds. The solution was kept at 30° C. while being stirred and was filtered after 5 hours, to obtain:

Crystals (dry), 11.0 g. ---------- $(\alpha)_D^{25}=+21.0°$
Mother liquor, 148.0 g. ---------- $(\alpha)_D^{25}=-0.78°$ In the above steps, the rate of crystallization was controlled at about 1.7% per hour, and the obtained crop was about 8% of the total racemic glutamic acid in the solution.

19.0 g. of 5% HCl aqueous solution were added to the crystals and the mixture was filtered after agitation. The separated crystals were lightly washed with water and dried, to obtain 6.0 g. of pure L-glutamic acid (total nitrogen 9.52%, $(\alpha)_D^{25}=+31.6°$).

(B) To the 148 g. of the mother liquor (total glutamic acid 30.0%, D-glutamic acid 2.24%) were added 15.7 g. of racemic glutamic acid monhydrates (total nitrogen 8.49%; $(\alpha)_D=\pm 0.00°$), containing 14.0 g. of anhydrous glutamic acid, as a solid phase and 5.0 g. of pure D-glutamic acid (total nitrogen 9.53%, $(\alpha)_D=-31.6°$) as crystal seeds. The solution was kept at 30° C. while being stirred and was filtered after 8 hours.

Crystals (dry), 18.7 g. ---------- $(\alpha)_D^{25}=-21.4°$
Mother liquor, 145 g. ---------- $(\alpha)_D^{25}=+0.84°$ In the above step, the rate of crystallization was controlled at about 2.2% per hour, and the obtained crop was about 17% of the total quantity of racemic glutamic acid in the solution.

33.0 g. of 5% HCl aqueous solution was added to the crystals and the mixture was filtered after agitation. The separated crystals were lightly washed with water and dried. 10.9 g. of crystals of pure D-glutamic acid (total nitrogen 9.51%, $(\alpha)_D^{25}=-31.2°$) was thus obtained.

When a similar operation was performed under the same conditions, except that the temperature was 17° C. instead of 30° C. and total glutamic acid about 26% instead of 29.2% in 150 g. of the filtrate, the following was obtained:

Crystals (dry), 11.0 g---------- $(\alpha)_D^{25}=+10.2°$
Mother liquor, 149 g---------- $(\alpha)_D^{25}=\pm 0.0°$ The above rotation for the crystals was due to the crystal seeds, and the rotation for the mother liquor indicated no presence of the antipode, and hence no resolution. All that was obtained were the crystal seeds and the added racemic glutamic acid monohydrate.

Another similar operation was performed under the same conditions, with the exception that the temperature was 60° C. and total glutamic acid was 33% in 150 g. of the filtrate, and the following was obtained:

Crystals (dry), 10 g---------- $(\alpha)_D^{25}=+11.1°$
Mother liquor, 148 g---------- $(\alpha)_D^{25}=\pm 0.0°$ The rotation indicated for the crystals was due to the crystal seeds and the rotation for the mother liquor indicated no presence of the antipode, and hence no resolution. In this comparative experiment too, all that was obtained was the crystal seeds, and the added racemic glutamic acid monohydrate was converted into anhydrate.

EXAMPLE 2

(A) A 3.7% NaOH aqueous solution was saturated with racemic glutamic acid anhydrate (total nitrogen 9.53%; $(\alpha)_D=\pm 0.00°$) at 30° C. and filtered. To 142 g. of the filtrate (total glutamic acid 14.0%; pH 5.0) were added 5.05 g. of racemic glutamic acid monohydrate (total nitrogen 8.49%; $(\alpha)_D=\pm 0.00°$), containing 4.5 g. of anhydrous glutamic acid, as a bottom solid or solid phase, and 2.0 g. of pure L-glutamic acid (total nitrogen 9.53%; $(\alpha)_D=+31.6°$) as crystal seeds. The solution was kept at 30° C. while being stirred and was filtered after 4 hours, to obtain:

Crystals (dry), 7.0 g---------- $(\alpha)_D^{25}=+20.5°$
Mother liquor, 142.0 g---------- $(\alpha)_D^{25}=-0.56°$ In the above step, the rate of crystallization was controlled at about 3% per hour, and the obtained crop was about 12.5% of the total racemic glutamic acid in the solution.

The crystals were mixed with 13.5 g. of 5% HCl aqueous solution and the mixture was filtered after agitation. The separated crystals were lightly washed with water and dried, to obtain 3.8 g. of pure L-glutamic acid (total nitrogen 9.51%; $(\alpha)_D^{25}=+31.2°$).

(B) To the 142 g. of mother liquor (total glutamic acid 14.1%; D-glutamic acid 1.75%; pH 4.9) were added 10.1 g. of racemic glutamic acid monohydrate (total nitrogen 8.49%; $(\alpha)_D=\pm 0.00°$), containing 9.0 g. of anhydrous glutamic acid, as a bottom solid or solid phase; and 4.5 g. of D-glutamic acid (total nitrogen 9.53%; $(\alpha)_D=-31.6°$) as crystal seeds. The solution was kept at 30° C. while being stirred and was filtered after 7 hours, to obtain:

Crystals (dry), 13.5 g---------- $(\alpha)_D^{25}=-22.0°$
Mother liquor, 141.5 g---------- $(\alpha)_D^{25}=+0.52°$ In the above step, the rate of crystallization was controlled at about 3.5% per hour, and the crop obtained was about 24% of the total racemic glutamic acid in the solution.

21 g. of 5% HCl solution was added to the crystals and the mixture was filtered after agitation. The separated crystals were lightly washed with water and dried, to obtain 8.4 g. of crystals of pure D-glutamic acid (total nitrogen 9.53%, $(\alpha)_D^{25}=-31.6°$).

The following specific Examples 3 to 6 of the invention illustrate the use of cooling to effect supersaturation for resolution:

EXAMPLE 3

200 g. of 6.5% HCl aqueous solution saturated with racemic glutamic acid monohydrate (total nitrogen 8.49%; $(\alpha)_D=\pm 0.00°$) was prepared at 45° C. and filtered. The filtrate (total glutamic acid 24.2%) was inoculated or seeded with 1.5 g. of L-glutamic acid (total nitrogen 9.53%; $(\alpha)_D=+31.6°$) and allowed to cool at a rate of 5° C. per hour with vigorous stirring. After cooling down to 30° C. requiring 3 hours, the solution was kept at that temperature for 2 hours and filtered. The crystalline L-glutamic acid was washed with a small quantity of water and dried, to obtain: Crystals, 5.6 g. (net wt. 4.1 g.), $(\alpha)_D^{25}=+31.6°$ (pure).

In the above step, the rate of crystallization was about 1% per hour and the crop was about 6% of the total racemate.

The mother liquor was mixed with racemic glutamic acid (total nitrogen 9.53%; $(\alpha)_D=\pm 0.00°$) and heated to a temperature of 56° C. When almost saturated, it was filtered instantly. The filtrate (total glutamic acid 25.8%) was inoculated with 1.5 g. of D-glutamic acid (total nitrogen 9.53%; $(\alpha)_D=-31.6°$) and allowed to cool at a rate of 5° C. per hour with vigorous stirring. After a treatment similar to that described above for L-glutamic acid, the obtained D-glutamic acid was: Crystals, 9.3 g. (net wt. 8.8 g.) $(\alpha)_D^{25}=-31.3°$ (pure).

In the above example, the rate of crystallization of optically active glutamic acid was about 2–3% per hour and the crop was about 14% of the total racemate. In comparative experiments, the rate of crystallization was increased by raising the rate of cooling from 5° C. per hour to 12–13° C. per hour, with resulting rates of crystallization of 6–7% per hour. In these experiments, the net weight of optically active crystals was found to be 8.3 g. when it was attempted to increase the rate of crystallization of optically active glutamic acid to reach 9% and 12% per hour, that is, beyond the limit of 7.5% per hour, by further increasing the rate of cooling to 20° C. and 26° C. per hour, respectively, the rate of crystallization of optically active glutamic acid dropped to 7% and 4.5% per hour and the net weight of optically active glutamic acid actually obtained decreased to 6.3 g. and 4.0 g., respectively, as indicated in the following table:

| Rate of cooling (° C./hr.) | Cooling time (hr.) | Total crop (g.) | Dry substance (g.) | $(\alpha)_D^{25}$ | Rate of crystallization of optical isomer (percent per hour) |
|---|---|---|---|---|---|
| 5 | 5 | 9.3 | 8.8 | −31.3 | about 2–3 |
| 12–13 | 2 | 9.0 | 8.3 | −31.4 | 6–7 |
| 20 | 1.3 | 8.6 | 6.3 | −30.5 | 7 |
| 26 | 1 | 7.9 | 4.0 | −30.4 | 4.5 |

Further comparative experiments were made with respect to the previously indicated limit of 25% concerning the total crystallization in each stage of the operation in relation to the total quantity of glutamic acid as follows:

| Total quantity of optical isomer crystallized in each stage as a percent of the total racemic glutamic acid in the solution (percent) | Total crop (g.) | Dry Substance (optical) isomer) | $(\alpha)_D^{25}$ |
|---|---|---|---|
| about— | | | |
| 14 | 9.3 | 8.8 | −31.3 |
| 19 | 14.5 | 11.9 | −31.3 |
| 24 | 17.5 | 13.7 | −31.5 |
| 9 | 22.0 | 6.0 | −31.4 |

In the final experiment listed in the above table, an attempt was made to raise the total quantity of optical isomer to about 31% by means of increasing the quantity of racemic glutamic acid to be supplemented during the operation, thereby increasing the total crop to 22 g. However, total quantity of optical isomer was actually decreased to 9% of the total glutamic acid and the net weight of optically active glutamic acid actually obtained was only 6.0 g.

EXAMPLE 4

200 g. of 5.05% NaOH aqueous solution saturated with racemic glutamic acid anhydrate (total nitrogen 9.53%; $(\alpha)_D=\pm0.00°$) was prepared at 45° C. and filtered. The filtrate (total glutamic acid 18.3%; pH 5.0) was inoculated with 1.5 g. of L-glutamic acid (total nitrogen 9.53%; $(\alpha)_D=+31.6°$) and allowed to cool at a rate of 5° C. per hour with vigorous stirring. After cooling down to 30° C. requiring 3 hours, the solution was kept at that temperature for 1 hour and then filtered. The crystalline L-glutamic acid was washed with a small quantity of water and dried to obtain: Crystals 5.2 g. (net wt. 3.7 g.), $(\alpha)_D^{25}=+31.4°$ (pure).

In the above step, the controlled rate of crystallization was 1–2% per hour, and the crop was 6% of the total racemate.

The mother liquor was mixed with racemic glutamic acid (total nitrogen 9.53%; $(\alpha)_D=\pm0.00°$) and heated to a temperature of 56° C. When almost saturated, it was filtered instantly. The filtrate (total glutamic acid 19.7%) was inoculated with 1.5 g. of D-glutamic acid (total nitrogen 9.53%; $(\alpha)_D=-31.6°$) and allowed to cool at a rate of 5° C. per hour with vigorous stirring. After a treatment similar to that described above in connection with the L-glutamic acid, the obtained D-glutamic acid was: Crystals 8.2 g. (net wt. 7.2 g.), $(\alpha)_D=-31.5°$ (pure).

In the above step, the controlled rate of crystallization was about 1.5–4% per hour, and the crop obtained was about 14% of the total racemate.

EXAMPLE 5

40 g. of a clear saturated solution of racemic monoammonium glutamate monohydrate (total nitrogen present in the form of $NH_4$ and $NH_2$ being each 7.7%; $(\alpha)_D=\pm0.00°$), containing 59% of said glutamate as its anhydrate, was prepared at 40° C. Said solution was inoculated with 1.0 g. of L-monoammonium glutamate monohydrate (total nitrogen present in the form of $NH_4$ and $NH_2$ being each 7.7% $(\alpha)_D=+25.8°$) and allowed to cool at a rate of 3–5° C. per hour with continuous stirring. When cooled down to 31° C., the solution was filtered, to obtain: Crystals, 4.5 g., $(\alpha)_D^{25}=+15.7°$.

In the above step, the controlled rate of crystallization was about 2–4% per hour, and the crop was about 7% of the total racemate.

The mother liquor was mixed with racemic monoammonium glutamate monohydrate and heated to a temperature of 46° C. When almost saturated, it was filtered instantly. The filtrate (total content of said ammonium glutamate 63% as anhydrate thereof) was inoculated with 1.0 g. of D-monoammonium glutamate monohydrate (total nitrogen present in the form of $NH_4$ and $NH_2$ being each 7.7% $(\alpha)_D=-25.8°$) and allowed to cool at a rate of 3–5° C. per hour with continuous stirring. When cooled down to 30° C., it was filtered to obtain: Crystals, 7.0 g., $(\alpha)_D^{25}=-17.0°$.

In the above step, the controlled rate of crystallization was about 2.5–5% per hour, and the crop was about 14% of the total racemate.

Both of the above kinds of crystals resulted in almost pure active monoammonium glutamate monohydrates (total nitrogen present in the form of $NH_4$ and $NH_2$ being each 7.7% in each case; $(\alpha)_D=+25.70$ or $-25.7°$), when mixed with a quantity of water just sufficient to dissolve the racemic glutamate accompanied by said active glutamates and then filtered.

EXAMPLE 6

50 g. of a clear saturated solution of racemic glutamic acid hydrochloride (total glutamic acid hydrochloride 49%) was prepared at 45° C. The above solution was inoculated with 1.0 g. of L-glutamic acid hydrochloride (total nitrogen 7.62%; $(\alpha)_D=+25.6°$) and allowed to cool at a rate of 5° C. per hour with continuous stirring. When cooled down to 33° C., the solution was filtered to obtain: Crystals, 4.8 g., $(\alpha)_D^{25}=+20.0°$.

In the above step, the controlled rate of crystallization was about 5% per hour, and the crop was about 11% of the total racemate in the solution.

The mother liquid (total glutamic acid hydrochloride 45%; D-glutamic acid hydrochloride 5.97%) was mixed with racemic glutamic acid hydrochloride (total nitrogen 7.62%; $(\alpha)_D=\pm0.00°$) and heated to a temperature of 56° C. When almost saturated, it was filtered instantly. The filtrate (total glutamic acid hydrochloride 51.7%; D-glutamic acid hydrochloride 5.09%) was inoculated with 1.0 g. of D-glutamic acid hydrochloride (total nitrogen 7.62%; $(\alpha)_D=-25.6°$) and allowed to cool at a rate of 5–8° C. per hour with continuous stirring. When cooled down to 32° C., the solution was filtered to obtain: Crystals, 7.9 g., $(\alpha)_D=-18.6°$.

In the above step, the controlled rate of crystallization was about 4–6% per hour, and the obtained crop was about 18% of the total racemate (racemic glutamic acid) in the solution.

Both of the above kinds of crystals resulted in almost pure active glutamic acid hydrochlorides (total nitrogen 7.61% for each; $(\alpha)_D=+25.5°$ or $-25.6°$, respectively), when mixed with a quantity of water just sufficient to dissolve the racemic hydrochloride accompanied by the active hydrochloride and then filtered.

In comparative experiments, range of temperatures for cooling in the above example was variously changed as follows:

| Range of temperature | Crop, g. | $(\alpha)_D^{25}$, degrees | Total quantity of optical isomer, percent |
|---|---|---|---|
| from 56 to 32° C. | 7.9 | −18.6 | 18 |
| from 39 to 20° C. | 6.5 | −17.7 | 14 |
| from 20 to 4° C. | 4.0 | −16.6 | 8 |
| from 79 to 65° C. | 7.3 | −17.5 | 12 |
| from 92 to 81° C. | 8.6 | −11.6 | 7.5 |

The fact to be understood from the above table is that the range between 30° C. and 60° C. gives the best result, and the ranges below 20° C. and above 80° C. give the worst results.

Operation at too low temperatures gives a decreased total quantity of optical isomer which represents a poor operating efficiency. Moreover, cooling below room temperature is very expensive in an industrial operation. On the other hand, too high temperatures results in a very viscous solution of high concentration which greatly obstructs the crystallization, separation of crystals and the like.

EXAMPLE 7

The mother liquor separated in step (B) of Example 1, weighing 145 g. and having a rotation $(\alpha)_D^{25}=+0.84°$, was further subjected to a similar procedure for resolution and such procedure was repeated about ten times. The following table is a summary of the results obtained in the subsequent repeated steps of the process. Said steps (A) and (B) in Example 1 were numbered respectively 1 and 2.

| Step | Used | | | Isomer | Obtained | | | Balance (isomer obtained by resolution, g.) |
|---|---|---|---|---|---|---|---|---|
| | Racemic monohydrate, g. | Calculated as anhydrate, g. | Crystal seeds, g. | | $(\alpha)_D$, degrees | Total crop, g. | Isomer in crop, g. | |
| 1 | 7.85 | 7.0 | 3.5 | L | +21.0 | 11.0 | 7.2 | 3.7 |
| 2 | 15.70 | 14.0 | 5.0 | D | −21.4 | 18.7 | 12.5 | 7.5 |
| 3 | 15.70 | 14.0 | 5.0 | L | +20.8 | 19.1 | 12.4 | 7.4 |
| 4 | 15.70 | 14.0 | 5.0 | D | −20.7 | 19.1 | 12.4 | 7.4 |
| 5 | 15.70 | 14.0 | 5.0 | L | +20.8 | 18.9 | 12.3 | 7.3 |
| 6 | 15.70 | 14.0 | 5.0 | D | −20.6 | 18.9 | 12.2 | 7.2 |
| 7 | 15.70 | 14.0 | 5.0 | L | +21.2 | 18.7 | 12.4 | 7.4 |
| 8 | 15.70 | 14.0 | 5.0 | D | −20.9 | 18.7 | 12.2 | 7.2 |
| 9 | 15.70 | 14.0 | 5.0 | L | +21.0 | 18.6 | 12.2 | 7.2 |
| 10 | 15.70 | 14.0 | 5.0 | D | −20.8 | 18.8 | 12.2 | 7.2 |
| 11 | 15.70 | 14.0 | 5.0 | L | +21.1 | 18.7 | 12.3 | 7.3 |
| Totals | 164.85 | 147.0 | | | | | | 75.8 |

As illustrated in the above table 75.8 g. of active glutamic acid was obtained from 164.85 g. of racemic glutamic acid monohydrate containing 147 g. of racemic glutamic acid as its anhydrate.

EXAMPLE 8

20 kg. of a solution, containing 5.5% of HCl and 24% of racemic glutamic acid and belonging to the same range as in Example 3, was subjected to the resolution procedure of that example, but on an industrial scale in accordance with this invention. The quantities listed in the following table for the additions of pure racemic glutamic acid anhydrate (total nitrogen 9.53% $(\alpha)_D=\pm 0.00°$) in each step, were added to the mother liquor of the preceding step and dissolved completely in the latter by heating at 60–65° C. Upon sudden cooling to 48° C., 150 g. of pure L- or D-glutamic acid (total nitrogen 9.53%; $(\alpha)_D=+31.6°$ or $-31.6°$) was added to the solution in each step of resolution as crystal seeds. The solution was allowed to cool gradually at a rate of 6° C. per hour. When cooled down to 30° C., it was filtered and developed crystals were collected. Crystals were washed with water, dried and analysed. The mother liquor in each step was adjusted to provide 20 kg. and then subjected to the successive steps of the process. The following table is a summary of the results obtained in the subsequent steps of the process repeated fifteen times.

| Step | Used | Isomer | Obtained | | |
|---|---|---|---|---|---|
| | Racemic glutamic acid anhydride, kilograms | | $(\alpha)_D$, degrees | Total Crop, kilograms | Isomer in Crop, kilograms |
| 2 | 0.78 | L | +29.6 | 0.80 | 0.74 |
| 3 | 0.80 | D | −28.4 | 0.81 | 0.72 |
| 4 | 0.80 | L | +28.4 | 0.80 | 0.71 |
| 5 | 0.80 | D | −28.8 | 0.79 | 0.71 |
| 6 | 0.80 | L | +29.6 | 0.78 | 0.72 |
| 7 | 0.80 | D | −29.6 | 0.79 | 0.73 |
| 8 | 0.80 | L | +29.1 | 0.77 | 0.70 |
| 9 | 0.80 | D | −28.4 | 0.80 | 0.71 |
| 10 | 0.80 | L | +28.8 | 0.80 | 0.72 |
| 11 | 0.80 | D | −29.6 | 0.79 | 0.73 |
| 12 | 0.80 | L | +28.0 | 0.80 | 0.70 |
| 13 | 0.80 | D | −29.2 | 0.78 | 0.71 |
| 14 | 0.80 | L | +28.6 | 0.77 | 0.69 |
| 15 | 0.80 | D | −29.5 | 0.77 | 0.71 |
| Total | 11.18 | | | L 5.52 | 5.01 |
| | | | | D 5.53 | 5.01 |

As shown in the above table, 11.18 kg. of racemic glutamic acid anhydrate was resolved into 5.52 kg. of L-compound (5.01 kg. of L-glutamic acid) and 5.53 kg. of D-compound (5.01 kg. of D-glutamic acid).

EXAMPLE 9

An aqueous solution containing 34.5% of racemic glutamic acid and 12.2% of sulfuric acid was prepared at 30° C. To 174 g. of the clear solution there were added 30 cc. of an aqueous solution containing 4.7 g./dl. of potassium hydroxide at a rate of 20 cc. per hour under moderate agitation in order to effect supersaturation by partial neutralization. After 10 minutes since the beginning of the addition of potassium hydroxide, 3.5 g. of pulverized crystals of D-glutamic acid were added to the supersaturated solution as seeding crystals. Following filtering, washing and drying, there was obtained: Crystals (1), 7.5 g., $(\alpha)_D^{25}=-26.0°$.

In the above, the rate of crystallization of D-glutamic acid was controlled at about 3% per hour and the obtained crop was about 4.5% of the total quantity of racemic glutamic acid in the solution. To 190 g. of filtrate or mother liquor remaining after removal of the D-glutamic acid crystals, at 30° C. and containing 28.4% of whole glutamic acid, 1.29% of L-glutamic acid, 9.9% of sulfuric acid and 1.10% of potassium sulfate, there were added, while undergoing moderate agitation, 40 cc. of an aqueous solution containing 8.75 g./dl. of potassium hydroxide over a period of 3 hours. 10 minutes after the beginning of the addition of potassium hydroxide, 3.5 g. of pulverized crystals of L-glutamic acid were added as seeding crystals. Following filtering, washing and drying, there was obtained: Crystals (2) 14 g., $(\alpha)_D^{25}=+23.5°$.

In this step, the rate of crystallization of L-glutamic acid was controlled at about 4% per hour and the obtained crop was about 12% of the total quantity of racemic glutamic acid in the solution. The crystals (1) and (2) obtained, as above, were washed separately as in Example 1, and the purse crystals weighed:

D-glutamic acid, 5.5 g. ---------- $(\alpha)_D^{25}=-31.4°$
L-glutamic acid, 9.8 g. ---------- $(\alpha)_D^{25}=+31.1°$

EXAMPLE 10

At values of pH below 7.0, glutamic acid forms water-soluble salts with alkali earth metals in the same way as with alkali metals. For the formation of such glutamates, either hydroxides or carbonates of either alkali metals or alkali earth metals may be used. Calcium carbonate was therefore adopted in this example which employs evaporation to effect supersaturation.

As will be apparent from the table in Example 7, the operations from the 2nd step onward should be considered normal running under ordinary operating conditions. In the present example, however, a quantity of L-glutamic acid was added to the original solution in order to effect normal running from the beginning, that is, during the first step or crystallizing stage.

To 420 g. of about a 2% aqueus solution of L-glutamic acid, 80 g. of racemic glutamic acid and 20 g. of $CaCO_3$ were added. The resulting solution was stirred at 55° C. for 1 hour and then filtered. The filtrate had a glutamic acid concentration of 16.7%, while L-glutamic acid content was 1.02% and its pH was 4.5.

To 350 g. of such filtrate, 7 g. of L-glutamic acid (purity 94%) and 50 cc. of aqueous racemic glutamic acid solution of 5 g./dl. (concentration) was added. The foregoing mixture was concentrated, in vacuum, at a rate of evaporation of 40–70 cc./hr. by heating it at 55–60° C. Every hour, 50 cc. of racemic gultamic acid solution of 5 g./dl. (concentration) was supplied, and observations were intermittently made with respect to specific rotation.

When the concentrated solution was filtered after 4 hours, 200 cc. of said racemic glutamic acid solution had been added and 212 cc. of water had been avaporated, and the following was obtained: Crystals, 15 g., $(\alpha)_D^{25}=+25.2°$.

The operation was controlled at a rate of crystallization of about 2.2% per hour and a total crystallization of about 9% of total glutamic acid.

Although the above specific examples have been included herein to illustrate the invention, it is to be understood that the invention is not limited to such examples, except as defined in the appended claims.

What is claimed is:

1. A method for resolving DL-glutamic acid into its optical isomers which comprises forming an aqueous saturated solution of DL-glutamic acid having a pH value within the ranges of approximately 0.2 and 2.0 and approximately 4.0 and 7.0, respectively, adding DL-glutamic acid monohydrate to an aqueous saturated solution of DL-glutamic acid at a temperature within the range between the transition point of said monohydrate to anhydrate and approximately 50° C., so that said monohydrate forms a bottom solid in said solution to supersaturate the latter, seeding said supersaturated solution with crystals of one of said isomers and agitating to cause said one isomer to crystallize out of said supersaturated solution while maintaining the latter at a temperature within said range so that said monohydrate progressively enters into said solution to maintain the supersaturated condition of the latter as said one isomer is crystallized, filtering said solution to separate crystals containing said one isomer from the mother liquor, adding DL-glutamic acid monohydrate to said mother liquor to again form a supersaturated solution of the latter and to restore the supply of bottom solid therein, seeding the supersaturated solution with crystals of the other of said isomers and agitating to cause said other isomer to crystallize out of said supersaturated solution while maintaining the temperature of the latter within said range so that said monohydrate progressively enters into said solution to maintain the supersaturated condition of the latter as said other isomer is crystallized, and filtering the solution containing the crystallized other isomer for removing the latter, the crystallization of said one isomer and of said other isomer being controlled to occur at a rate having a maximum of 7.5 percent per hour of the total quantity of DL-glutamic acid in the solution in each case, and the total quantity of said isomers crystallized in each case corresponding, at most, to 25 percent of said total quantity of DL-glutamic acid in the respective solution.

2. A method for resolving DL-glutamic acid into its optical isomers which comprises forming an aqueous saturated solution of DL-glutamic acid having a pH value within the ranges of approximately 0.2 and 2.0 and approximately 4.0 and 7.0, respectively, thereby to obtain a relatively high concentration of DL-glutamic acid in said saturated solution, super-saturating said solution, seeding said supersaturated solution with crystals of one of said isomers to cause said one isomer to crystallize out of said supersaturated solution, agitating the seeded solution to facilitate the crystallization of said one isomer while maintaining said solution in supersaturated state at a temperature between 20° C. and 80° C., controlling the rate of crystallization of said one isomer to a maximum of 7.5 percent per hour of the total quantity of DL-glutamic acid in the solution, and filtering the solution to recover said one isomer that has been crystallized therefrom following the crystallizing of a total quantity of said one isomer which corresponds, at most, to approximately 25 percent of said total quantity of DL-glutamic acid in the solution.

3. A method for resolving DL-glutamic acid into its optical isomers as in claim 2; wherein said solution is supersaturated by adding DL-glutamic acid monohydrate to the saturated solution to provide a bottom solid in the latter while maintaining the solution at a temperature in the range between approximately 25° C. and 40° C. so that said monohydrate enters into the solution to maintain the supersaturated condition of the latter as said one isomer is crystallized.

4. A method for resolving DL-glutamic acid into its optical isomers as in claim 2; wherein said saturated solution is supersaturated by cooling the latter at a rate of from 3° C. to 15° C. per hour.

5. A method for resolving DL-glutamic acid into its optical isomers as in claim 2; wherein said saturated solution is supersaturated by evaporating some of the water therefrom.

6. A method for resolving DL-glutamic acid into its optical isomers as in claim 2; wherein said saturated solution is supersaturated by partially neutralizing said saturated solution.

7. A method for resolving DL-glutamic acid into its optical isomers comprising dissolving DL-glutamic acid in water and in a mineral acid at a temperature between 20° C. and 80° C. until a saturated solution is formed with the amount of said mineral acid therein being within the range of from 0.6 to 10 equivalents per mole of DL-glutamic acid, supersaturating said solution, seeding said supersaturated solution with crystals of one of said isomers to cause said one isomer to crystallize out of said supersaturated solution, agitating the seeded solution to facilitate the crystallization of said one isomer while maintaining said solution in supersaturated state at a temperature between 20° C. and 80° C., controlling the rate of crystallization of said one isomer to a maximum of 7.5 percent per hour of the total quantity of DL-glutamic acid in the solution, and filtering the solution to recover said one isomer that has been crystallized therefrom following the crystallizing of a total quantity of said one isomer which corresponds, at most, to approximately 25 percent of said total quantity of DL-glutamic acid in the solution.

8. A method for resolving DL-glutamic acid into its optical isomers comprising dissolving DL-glutamic acid in water and in a soluble member of the group consisting of hydroxides and carbonates at a temperature of from 20° C. to 80° C., the amount of DL-glutamic acid being sufficient to form a saturated solution at said temperature, said soluble member being present in proportions of from 0.6 to 1.0 equivalents per mole of DL-glutamic acid, supersaturating said solution, seeding said supersaturated solution with crystals of one of said isomers to cause said one isomer to crystallize out of said supersaturated solution, agitating the seeded solution to facilitate the crystallization of said one isomer while maintaining said solution in supersaturated state at a temperature between 20° C. and 80° C., controlling the rate of crystallization of said one isomer to a maximum of 7.5 percent per hour of the total quantity of DL-glutamic acid in the solution, and filtering the solution to recover said one isomer that has been crystallized therefrom following the crystallizing of a total quantity of said one isomer which corresponds, at most, to approximately 25 percent of said total quantity of DL-glutamic acid in the solution.

9. A method for resolving DL-glutamic acid into its optical isomers as in claim 7; wherein said mineral acid is hydrochloric acid.

10. A method for resolving DL-glutamic acid into its optical isomers as in claim 7; wherein said mineral acid is sulfuric acid.

11. A method for resolving DL-glutamic acid into its optical isomers as in claim 8; wherein said soluble member is sodium hydroxide.

12. A method for resolving DL-glutamic acid into its optical isomers as in claim 8; wherein said soluble member is calcium carbonate.

*13. A method for resolving DL-glutamic acid into its optical isomers which comprises forming an aqueous saturated solution of DL-glutamic acid having a pH value within the ranges of approximately 0.2 and 2.0 and approximately 4.0 and 7.0, respectively, thereby to obtain a relatively high concentration of DL-glutamic acid in said saturated solution, super-saturating said solution, seeding said super-saturated solution with crystals of one of said isomers to cause said one isomer to crystallize out of said super-saturated solution, agitating the seeded solution to facilitate the crystallization of said one isomer while maintaining said solution in supersaturated state at a temperature between 20° C. and 80° C., controlling the rate of crystallization of said one isomer to a maximum of 7.5 percent per hour of the total quantity of DL-glutamic acid in the solution, and collecting the crystals of said one isomer following the crystallizing of a total quantity of said one isomer which corresponds, at most, to approximately 25 percent of said total quantity of DL-glutamic acid in the solution.*

*14. A method of resolving DL-glutamic acid into its optical isomers comprising dissolving DL-glutamic acid in water and in a mineral acid at a temperature between 20° C. and 80° C. until a saturated solution is formed with the amount of said mineral acid therein being within the range of from 0.6 to 10 equivalents per mole of DL-glutamic acid, supersaturating said solution, seeding said supersaturated solution with crystals of one of said isomers to cause said one isomer to crystallize out of said supersaturated solution, agitating the seeded solution to facilitate the crystallization of said one isomer while maintaining said solution in supersaturated state at a temperature between 20° C. and 80 C., controlling the rate of crystallization of said one isomer to a maximum of 7.5 percent per hour of the total quantity of DL-glutamic acid in the solution, and collecting the crystals of said one isomer following the crystallizing of a total quantity of said one isomer which corresponds, at most, to approximately 25 percent of said total quantity of DL-glutamic acid in the solution.*

*15. A method for resolving DL-glutamic acid into its optical isomers comprising dissolving DL-glutamic acid in water and in a soluble member of the group consisting of hydroxides and carbonates at a temperature of from 20° C. to 80° C., the amount of DL-glutamic acid being sufficient to form a saturated solution at said temperature, said soluble member being present in proportions of from 0.6 to 1.0 equivalents per mole of DL-glutamic acid, supersaturating said solution, seeding said supersaturated solution with crystals of one of said isomers to cause said one isomer to crystallize out of said supersaturated solution, agitating the seeded solution to facilitate the crystallization of said one isomer while maintaining said solution in supersaturated state at a temperature between 20° C. and 80° C., controlling the rate of crystallization of said one isomer to a maximum of 7.5 percent per hour of the total quantity of DL-glutamic acid in the solution, and collecting the crystals of said one isomer following the crystallizing of a total quantity of said one isomer which corresponds, at most, to approximately 25 percent of said total quantity of DL-glutamic acid in the solution.*

References Cited in the file of this patent or the original patent

UNITED STATES PATENTS 2,734,919 Amiard et al. ---------- Feb. 14, 1956

OTHER REFERENCES

Gilman: Organic Chemistry, vol. I (1938), pages 187–189.

Houben: Die Methoden der Organischen Chemie, vol. 2 (1943), page 1065.